Figure 1:
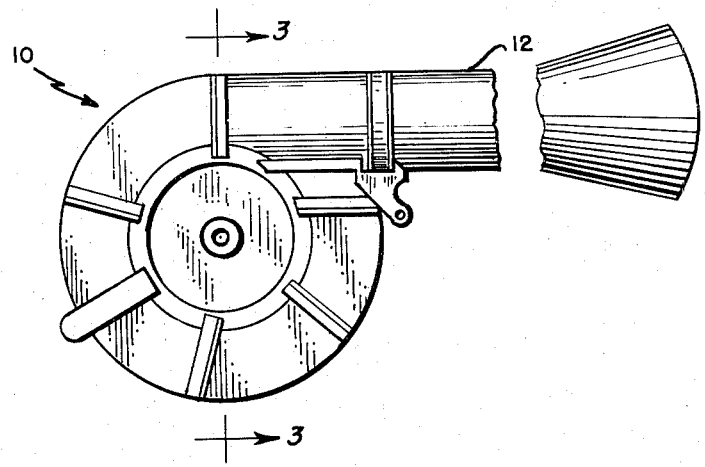

Oct. 3, 1961 G. R. SINCLAIR 3,002,715
DECELERATION PARACHUTE RETRACTION SYSTEM
Filed Nov. 4, 1958 7 Sheets-Sheet 1

*INVENTOR.*
GORDON R. SINCLAIR
BY
ATTORNEYS

INVENTOR.
GORDON R. SINCLAIR

Oct. 3, 1961  G. R. SINCLAIR  3,002,715
DECELERATION PARACHUTE RETRACTION SYSTEM
Filed Nov. 4, 1958  7 Sheets-Sheet 3

INVENTOR.
GORDON R. SINCLAIR
BY
ATTORNEYS

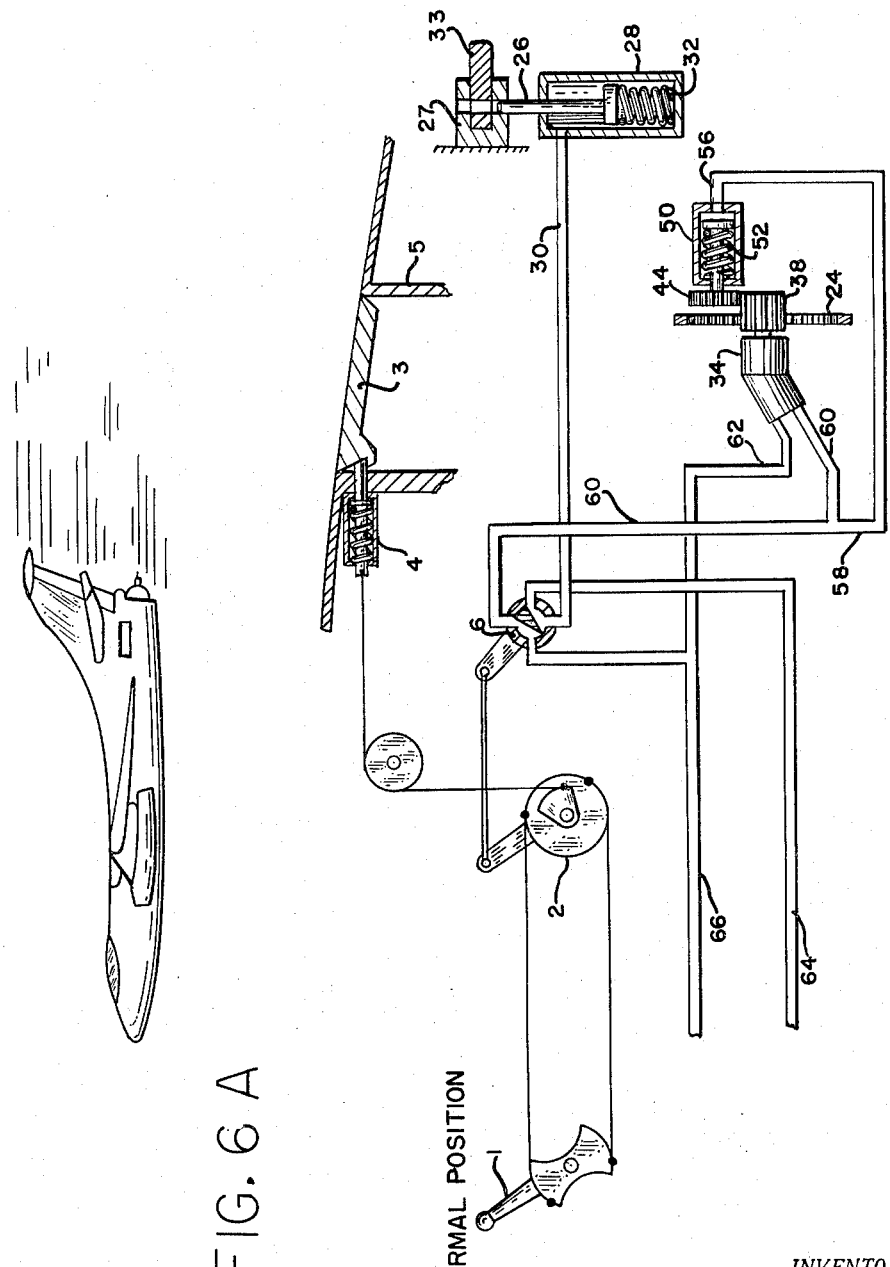

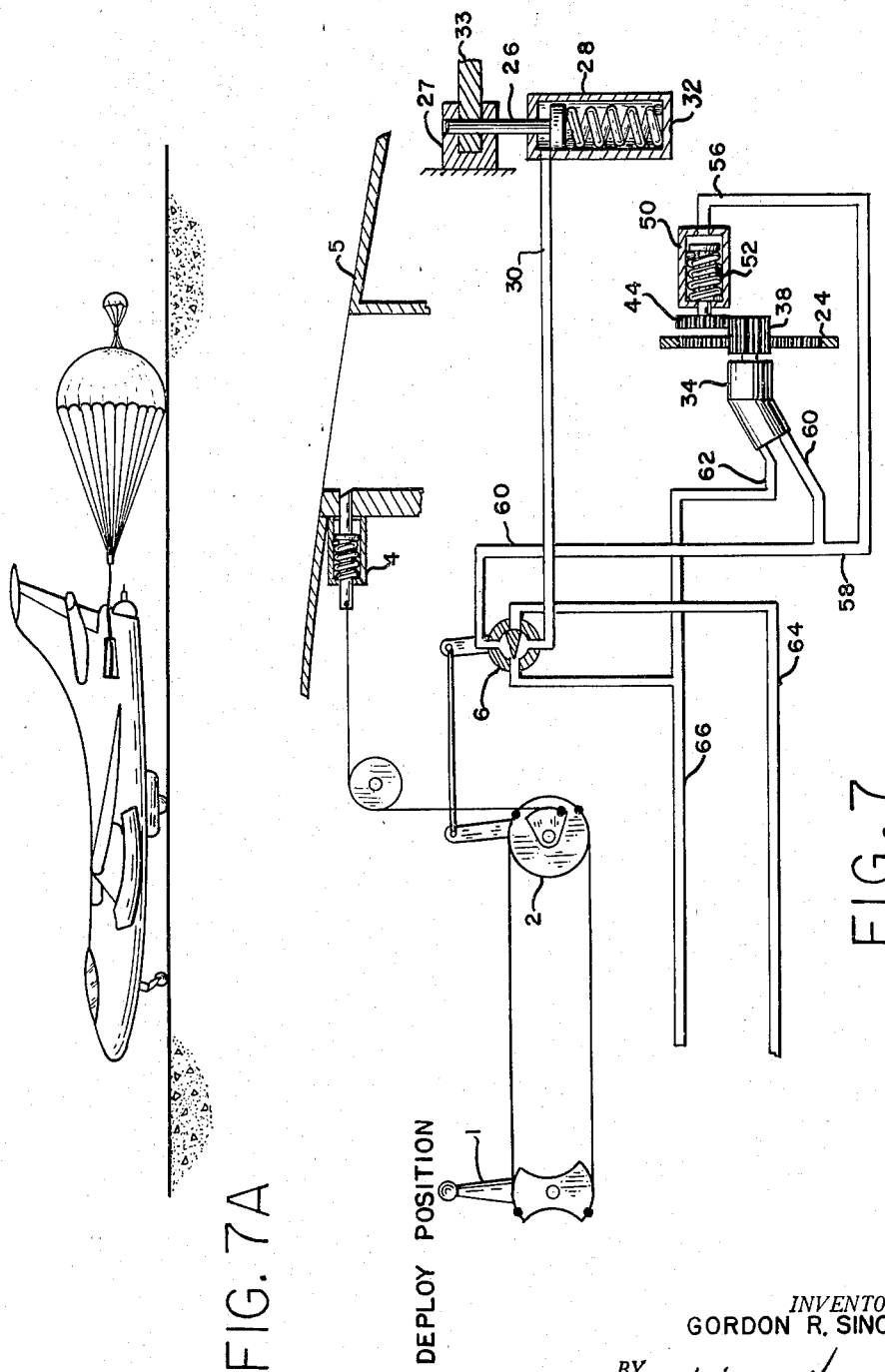

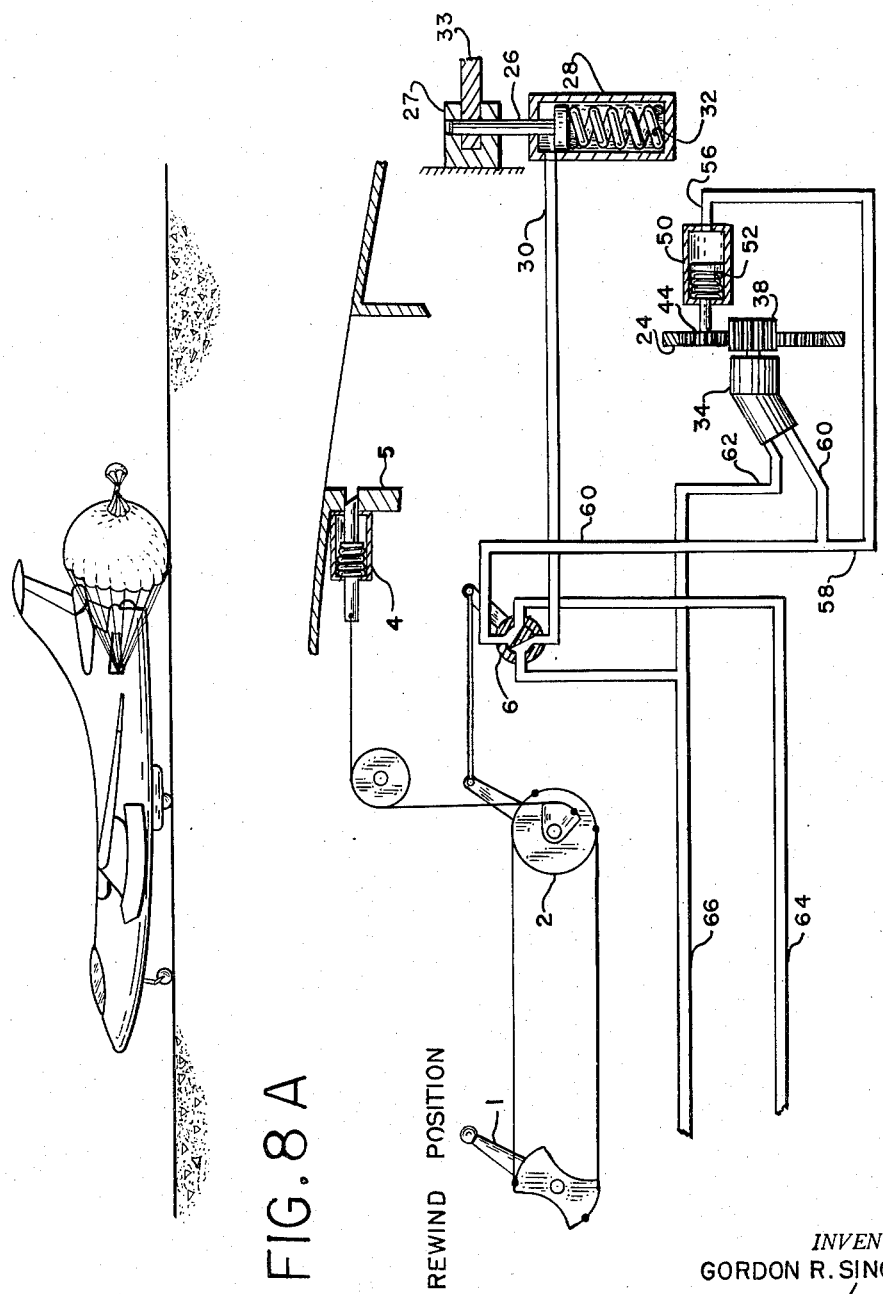

Oct. 3, 1961  G. R. SINCLAIR  3,002,715
DECELERATION PARACHUTE RETRACTION SYSTEM
Filed Nov. 4, 1958  7 Sheets-Sheet 7
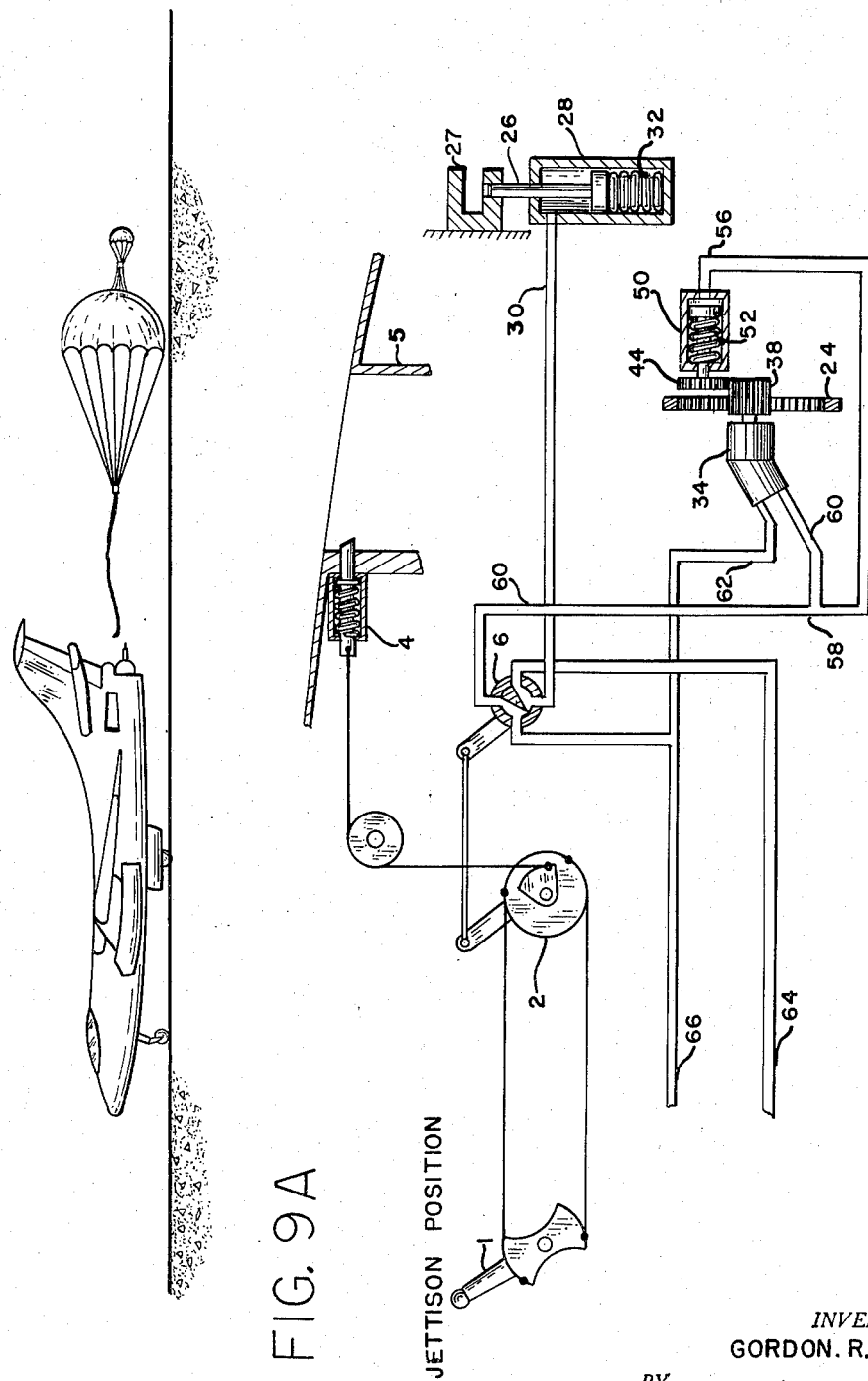
INVENTOR.
GORDON. R. SINCLAIR
BY
ATTORNEYS United States Patent Office 3,002,715
Patented Oct. 3, 1961

3,002,715
DECELERATION PARACHUTE RETRACTION
SYSTEM
Gordon R. Sinclair, Fallston, Md., assignor to the United States of America as represented by the Secretary of the Air Force
Filed Nov. 4, 1958, Ser. No. 771,929
4 Claims. (Cl. 244—113)

This invention relates to an improved means for retracting a deceleration or drag parachute now commonly used in landing a high speed airplane.

The modern jet plane, due to the configuration of its wings, must land at speeds approaching or exceeding 160 knots. Since the deceleration obtainable by applying brakes to the landing wheels and letting down flaps is limited and the advantage of reversing the pitch of the propellers is denied the jet engined plane, some other means of deceleration is needed. Unless some other decelerating means is provided an excessively long runway will be required.

The present practice is to use a drag parachute to aid deceleration, the chute being deployed by the pilot substantially as soon as the wheels touch the runway. It has been found that with a suitable drag chute the length of the ground run of a jet plane can be reduced 30 to 40 percent without in any way reducing the high speed performance of the plane.

The present practice is not without disadvantages, however, since the parachute must be folded by hand and stowed in the plane, and the pilot must jettison the chute when the plane speed is reduced to safe taxiing speed. If this is not done, the chute will be dragged on the ground and damaged or it may become entangled during ground and parking maneuvers. If it is jettisoned at the proper time, it may interfere with the landing of following aircraft and in any event must be recovered by a ground crew, inspected, repacked and restowed in the plane.

It is an object of this invention to overcome the disadvantages of the present practice by providing a means and system of controls which after deployment, are effective automatically to retract the parachute when the plane has reduced its speed to approximately 25 knots. Above this speed, the drag of the chute is useful in deceleration but below 25 knots the chute is not needed. The parachute may be retracted by a constant torque, fluid drive motor of the hydraulic or pneumatic type which will maintain the air speed of the chute, and thus keep it inflated, regardless of the speed of the plane down to about 10 knots when the chute will be fully retracted and stowed. This avoids dragging the chute on the runway, jettisoning it with the danger of possible entanglement with the plane or a following plane and the necessity of recovering the chute, refolding and stowing it for the next deployment.

Several attempts at a suitable retracting mechanism have been made but none of them have been entirely satisfactory due to space and weight limitations.

Figure 2:
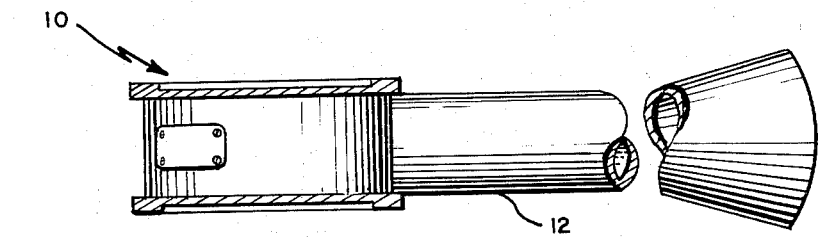
Figure 3:
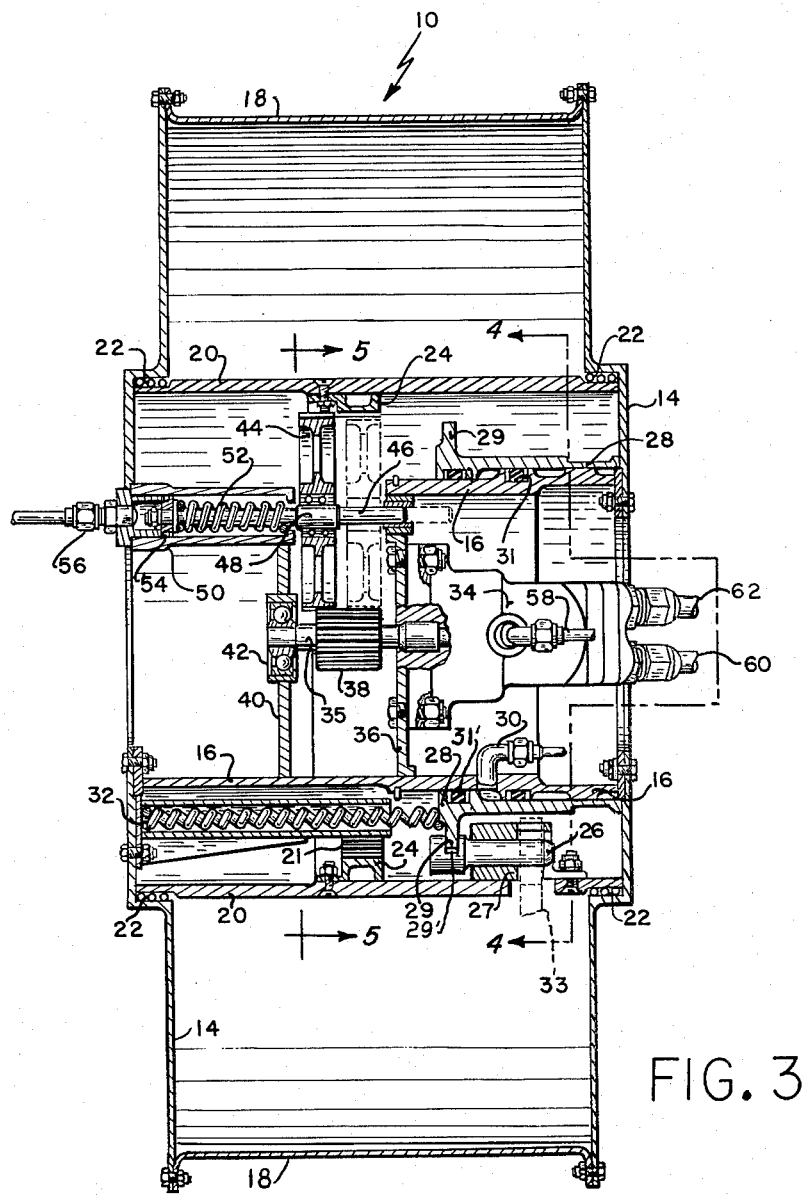
Figure 5:
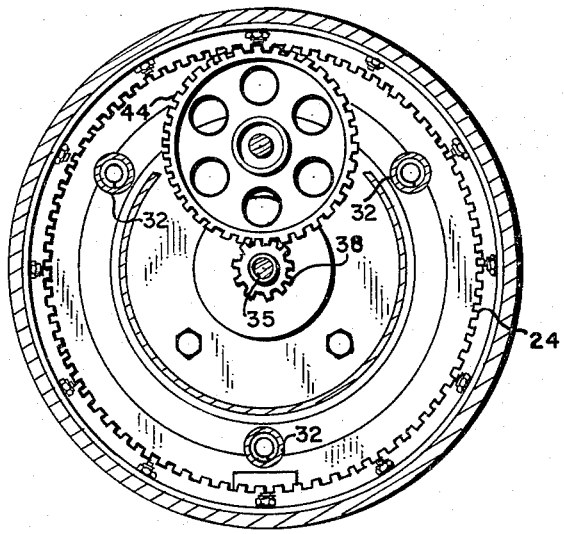
Figure 4:
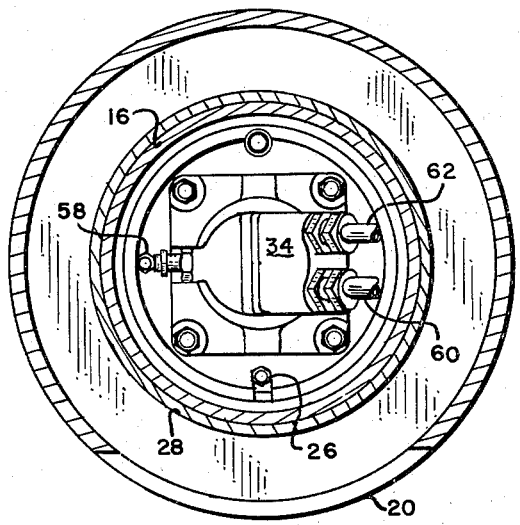

In the drawings:
FIG. 1 is a plan view of a preferred embodiment of this invention;
FIG. 2 is a side view of the device shown in FIG. 1;
FIG. 3 is a sectional view taken along the lines 3—3 of FIG. 1;
FIG. 4 is a sectional view taken along lines 4—4 of FIG. 3;
FIG. 5 is a sectional view along lines 5—5 of FIG. 3;
FIG. 6 is a schematic view showing the controls in normal position;
FIG. 7 is a schematic view showing the controls in deploy position;
FIG. 8 is a schematic view showing the controls in rewind position;
FIG. 9 is a schematic view showing the controls in jettison position; and
FIGS. 6A, 7A, 8A, 9A illustrate the various relative positions of the plane and the drag chute with the corresponding positions of the pilot's control handle.

In FIGURES 1 through 9, showing a preferred embodiment of this invention, a support structure or housing 10, consisting of side discs 14, a bell mouth tube, or conduit, 12, an internal cylinder 16 and outer covering 18, is fastened to the frame of the plane in any convenient manner and contains a revolving drum 20 which is free to revolve in said housing 10 on bearings 22. An internally toothed ring gear 24 is secured to the inner surface of said drum 20 and revolves with it. A riser attachment retaining pin 26, free to move in a support structure 27 fastened to revolving drum 20, is controlled by a retaining pin actuating cylinder 28. Said cylinder 28 is held in closed position by three compression springs 32. Cylinder 28 controls said pin 26 through a lip 29 on the rim of said cylinder 28 acting in a slot 29' in the said pin 26. Two large oil rings 31 and 31' seal off the said cylinder 28. When hydraulic pressure is applied to said cylinder 28 through line 30, the force of springs 32 is overcome and the pin 26 is disengaged from a riser fitting 33 which frees the parachute for jettisoning in case of accidental deployment.

A hydraulic or pneumatic drive motor 34 is mounted to the housing 10 through a bulkhead 36 attached to the internal support cylinder 16 and is provided with a shaft 35 which carries a drive gear 38 (FIG. 5) supported at one end in a ballbearing 42 held in a bulkhead 40 which is also fastened to said internal support cylinder 16. In mesh with said drive gear 38 is an idler gear 44. The idler gear 44 is free to revolve on a ballbearing 48 which in turn is made fast to an idler sliding shaft 46. Said shaft 46 is mounted for axial movement in a cylinder 50 which is held in a neutral position by a compression spring 52 until the force of the said spring 52 is overcome by hydraulic pressure. When hydraulic pressure is applied in said cylinder 50 through a pressure fitting 56, said idler gear shaft 46 carries idler gear 44 to the right as shown in FIG. 3 until it meshes with internal ring gear 24 and thus revolves rotating drum 20.

In the control mechanism shown in FIGS. 6, 7, 8 and 9 a pilot's control handle 1 controls a control quadrant 2 which in turn controls a four way selector valve 6 and a door latch 4. A door 3 is shown held in the outside skin of the airplane 5 by said latch 4 and is the external exit to bell mouth tube 12. A hydraulic or pneumatic pressure line 64 leading from the plane's pressure system, is shown connected to four way selector valve 6, and a hydraulic or pneumatic return line 66 is shown leading from said four way valve 6. A pressure line 60 leads from the valve 6 to the motor 34 and through a line 58 to the pressure fitting 56 leading to the idler gear actuating cylinder 50. A line 30 leads from valve 6 to chute retaining pin actuating cylinder 28.

Operation of the preferred embodiment of this invention is best understood by referring to FIGS. 6, 7, 8 and 9. With the control handle 1 in "normal" position as shown in FIG. 6, no load is transmitted by the cable from the central quadrant 2 to the door latch 4, so this latch 4 remains closed due to its spring loading. The four way valve 6 opens cylinder 28 to the pressure line which withdraws the retaining pin 26 connecting the drag chute riser fitting 33 to the support structure 27 so that if the parachute were deployed inadvertently, it would stream out the rear and escape.

FIG. 7 shows the control handle in "deploy" position. Quadrant 2 is rotated so as to mechanically withdraw door latch 4, freeing the door and permitting the pilot chute, which is made of compressible material, to expand and deploy; this in turn pulls out the main parachute from its stowed position on the revolving drum described above and the ensuing inflation of the main parachute produces the desired drag load on the aircraft. At the same time, the four way valve 6 connects the retaining pin actuating cylinder 28 to the return line and the spring 32 forces the pin 26 into the riser end fitting 33 and the aircraft retaining fitting 27 thereby attaching the parachute to the aircraft structure.

FIG. 8 shows the control handle 1 in "rewind" position, the idler gear actuating cylinder 50 connected to the pressure line by the four way valve 6; this meshes the idler gear 44 with the ring gear 24 and simultaneously the motor is connected to the pressure line and starts to rewind the drum 20. The rewind action starts when the torque of the motor overcomes the drag of the chute and continues until the parachute is fully rewound. The control handle is then returned to "normal" and all units are returned to their original positions ready for another cycle of operations.

If, while the parachute is deployed, some emergency should arise which would require jettisoning the parachute, this can be done by returning the control handle to "normal" as shown in FIG. 9. This position of the control handle connects the cylinder 28 to the pressure line and withdraws the riser retaining pin 26 from the riser fitting 33 and allows the parachute to escape.

One of the advantages of employing the combination of a constant torque hydraulic or pneumatic motor and a revolving drum for retracting and storing the parachute, with the system of controls just described is that the pilot can move the control handle to "rewind" as soon as deployment is complete and ignore it for the balance of the landing run. A constant displacement, constant torque hydraulic or pneumatic motor may be stalled, or even run backward, without harm, and as soon as the control is put in "rewind" the motor applies torque to the winding drum which is opposed by the drag of the parachute. As long as the drag of the parachute is greater than the pull of the motor the chute will continue to act as a brake, and as soon as the speed of the plane drops to 25 knots the torque of the motor overcomes the drag of the chute and the latter is retracted and stowed on the drum. When the retraction is complete the pilot's control handle is moved to "normal" position. The motor is stopped, the idler gear is disengaged and the riser pin withdrawn from the riser fitting. When the plane has stopped it is only necessary to repack the pilot chute manually and latch the door to complete a cycle of operations.

Having thus described my invention what I claim as new and desire to secure by Letters Patent of the United States is:

1. In a deceleration parachute retraction system the combination of a housing secured to the frame of an airplane, an opening in the fuselage of said airplane, a tube connecting said housing with said opening and having an enlarged portion adjacent said opening, a drum rotatably mounted in said housing, a constant torque motor mounted in said drum for driving said drum, a deceleration parachute having shroud lines, means for connecting said shroud lines to said drum, and a pilot chute secured to the canopy of said deceleration parachute, said drum and said housing being so proportioned to accommodate the deceleration parachute between said drum and said housing, and said tube being of a size to accommodate said pilot chute in a compressed condition.

2. A device as defined in claim 1 including a door means for closing said opening in said fuselage and a latch means for securing said door in a closed position until said latch means is released permitting said compressed pilot chute to force open said door and deploy itself.

3. A device as defined in claim 1 including means for disconnecting said deceleration parachute from said drum to permit said parachute to be jettisoned.

4. A device as defined in claim 1 wherein said constant torque motor is fluid operated with the torque exerted by said motor as applied to said drum adjusted to permit automatic retraction of said deceleration parachute when the speed of said airplane has been reduced to a predetermined speed such that the pull of said deceleration parachute is overridden by the force applied to said drum.

References Cited in the file of this patent

UNITED STATES PATENTS

| 1,972,967 | Zahodiakin | Sept. 11, 1934 |
| 2,363,732 | Jenkins | Nov. 28, 1944 |
| 2,511,601 | Smith | June 13, 1950 |
| 2,513,867 | Heffernan | July 4, 1950 |
| 2,709,054 | Roth | May 24, 1955 |
| 2,729,408 | Quilter | Jan. 3, 1956 |
| 2,729,409 | Hand | Jan. 3, 1956 |
| 2,823,881 | Patterson | Feb. 18, 1958 |

FOREIGN PATENTS

| 540,724 | Great Britain | Oct. 28, 1941 |